(12) United States Patent
Foster

(10) Patent No.: US 8,714,191 B2
(45) Date of Patent: May 6, 2014

(54) WATER CUT-OFF VALVE

(75) Inventor: Geoffrey Frederick Foster, Glenorie (AU)

(73) Assignee: Premier-Fosters (Australia) Pty Limited, North Rocks, New South Wales (AU)

( * ) Notice: Subject to any disclaimer, the term of this patent is extended or adjusted under 35 U.S.C. 154(b) by 412 days.

(21) Appl. No.: 12/597,897

(22) PCT Filed: Apr. 24, 2008

(86) PCT No.: PCT/AU2008/000577
§ 371 (c)(1),
(2), (4) Date: Mar. 25, 2010

(87) PCT Pub. No.: WO2008/131482
PCT Pub. Date: Nov. 6, 2008

(65) Prior Publication Data
US 2010/0193718 A1 Aug. 5, 2010

(30) Foreign Application Priority Data
Apr. 27, 2007 (AU) .............................. 2007902219

(51) Int. Cl.
*F16K 21/08* (2006.01)
(52) U.S. Cl.
USPC .............................. 137/517; 137/460; 138/37

(58) Field of Classification Search
USPC .............. 137/460, 461, 463, 517, 557, 519.5; 251/65; 138/37, 89
See application file for complete search history.

(56) References Cited

U.S. PATENT DOCUMENTS

| | | | |
|---|---|---|---|
| 1,270,015 A * | 6/1918 | Couch | 48/189.4 |
| 3,850,189 A | 11/1974 | Follett | |
| 3,955,835 A | 5/1976 | Farrington | |
| 4,921,008 A | 5/1990 | Foster | |
| 5,265,641 A * | 11/1993 | Anderson et al. | 137/460 |
| 5,280,806 A | 1/1994 | Glazebrook | |
| 5,549,130 A * | 8/1996 | Schuster | 137/39 |
| 5,992,465 A * | 11/1999 | Jansen | 138/37 |
| 6,997,214 B2 | 2/2006 | Kuo | |

FOREIGN PATENT DOCUMENTS

DE    101 39 858 A1    2/2003

* cited by examiner

*Primary Examiner* — Kevin Lee
*Assistant Examiner* — Macade Brown
(74) *Attorney, Agent, or Firm* — Kilpatrick Townsend & Stockton LLP

(57) ABSTRACT

A valve that is to be employed in a line through which fluid passes. The valve includes a movable valve element that is urged under the influence of gravity away from a valve seat but urged to engagement therewith if there is a failure downstream of the valve. The inlet passage is at least partly provided by a passage providing member having surfaces to engage water passing thereby, to cause the water to move angularly about a direction.

12 Claims, 1 Drawing Sheet

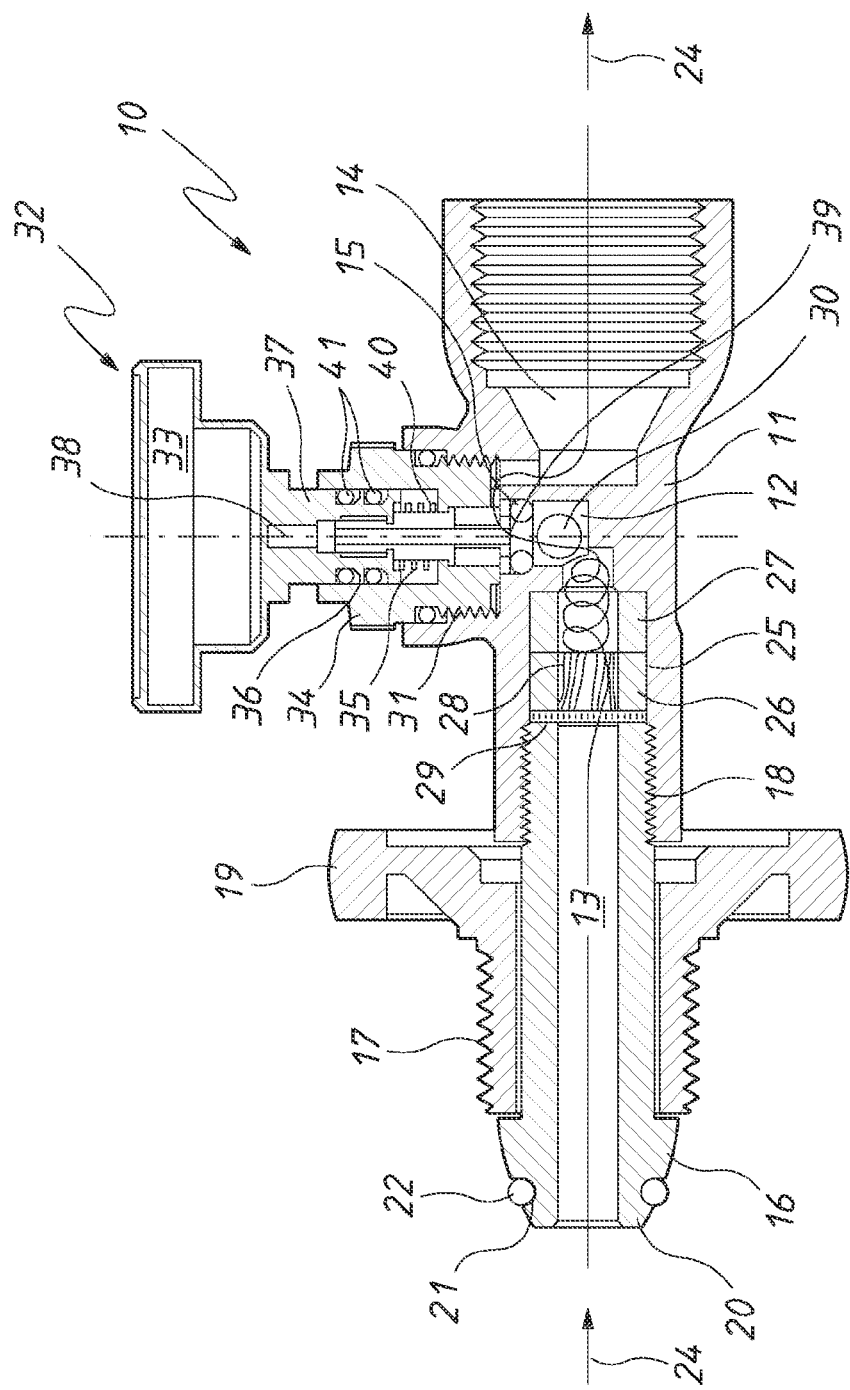

WATER CUT-OFF VALVE

CROSS REFERENCE TO RELATED APPLICATIONS

This application is a National Stage of International Application No. PCT/AU2008/000577 filed Apr. 24, 2008, and which claims the benefit of Australian Patent Application No. 2007902219, filed Apr. 27, 2007, the disclosures of all applications being incorporated herein by reference.

TECHNICAL FIELD

The present invention relates to valves and more particularly to valves employed in fluid flow lines to shut down flow should there be a failure downstream of the valve.

BACKGROUND OF THE INVENTION

Described in U.S. Pat. No. 4,921,008 (corresponding to Australian patent 597625) is a valve that is inserted in a flow line to prevent flow should there be a rupture downstream of the valve. Typically the valve of this USA patent is employed with a pressurised gas cylinder that provides gas to, for example, a stove or other appliance that uses the gas. Should there be a failure downstream of the valve, the valve is actuated to prevent further gas flowing from the cylinder.

OBJECT OF THE INVENTION

It is the object of the present invention to provide an improvement in or modification of the above valve.

SUMMARY OF THE INVENTION

There is disclosed herein a valve through which fluid flows in a predetermined direction including:
a hollow body providing a valve chamber, an inlet passage extending to said chamber, an outlet passage extending from said chamber, the passages providing for fluid flow through the chamber, and a valve seat exposed to said chamber and from which said outlet passage extends to provide for fluid flow from said chamber to said outlet passage;
a movable valve element located in said chamber and urged away from said seat, but movable to engage said seat to at least inhibit flow to said outlet passage should fluid flow through said chamber exceed a predetermined flow; and wherein
said inlet passage is at least partly provided by a passage providing member, said member having surfaces to engage fluid passing thereby to cause the fluid to move angularly about said direction.

Preferably, said surfaces are provided by grooves in said member, the grooves extending longitudinally and angularly relative to said inlet passage.

In an alternative preferred form, said surfaces are provided by fins projecting into said inlet passage and extending longitudinally and angularly relative to said inlet passage.

Preferably, said member is a sleeve through which said inlet passage extends.

Preferably, said valve includes a magnet located adjacent said inlet passage so as to provide a magnetic field intersecting with flow passing therethrough.

Preferably, said movable valve element is magnetised.

Preferably, said valve includes a filter through which fluid flows in said inlet passage passes for delivery to said chamber.

Preferably, said valve includes a valve element engaging member movable between a retracted position not engaged with said element, and an engaged position engaging said element to move the element from engagement with said seat.

Preferably, said engaging member is urged from engagement with said element.

Preferably, said engaging member is a longitudinally hollow shaft in communication with said chamber when said element is not engaged with said seat, and said valve includes a pressure gauge receiving fluid from said shaft to provide an indication of pressure downstream of said element.

Preferably, said element is urged away from said set via gravity and is moved upwardly into engagement with said seat when said predetermined flow is exceeded.

BRIEF DESCRIPTION OF THE DRAWING

A preferred form of the present invention will now be described by way of example with reference to the accompanying drawing that schematically depicts in section side elevation a valve through which a fluid such as water or gas flows.

DETAILED DESCRIPTION OF THE PREFERRED EMBODIMENT

In the accompanying drawing there is schematically depicted a valve 10. Typically the valve 10 would be located in a fluid flow line, and more particularly but not exclusively would be in a fluid flow line extending from a pressurised cylinder that provides gas under pressure to an appliance such as a gas stove. The valve 10 may also be employed in a line through which water passes.

The valve 10 includes a hollow body 11 providing a chamber 12. Extending to the chamber 12 is an inlet passage 13, while extending from the chamber 12 is an outlet passage 14. The outlet passage 14 extends from a valve seat 15 (seal) provided by a resilient "O-ring".

Threadably engaged with the body 11 is a spigot 16 that has a threaded length 18 securing the spigot 16 to the body 11. Mounted on and rotatable about the spigot 16 is a nut 19 having a threaded length 17 that threadably engages an item providing a fluid under pressure to sealingly connect the spigot 16 to the item. The spigot 16 has a head 20 with an annular groove 21 that receives a resilient seal 22 in the form of a resilient "O-ring". The passage 13 has a longitudinal axis 23 with flow in the direction of the arrow 24.

The body 11 has a bore 25 within which there is located a first sleeve 26 and a second sleeve 27. The sleeve 26 has surfaces 28 that engage the fluid passing thereby to cause the fluid to have an angular velocity about the general direction of flow along the passage 13, that is angularly about the axis 23. The surfaces 28 may be provided by grooves and/or fins extending longitudinally and angularly about the passage 13.

Preferably, the sleeve 27 is magnetised so as to provide a magnetic field extending across the passage 13.

Located between the sleeve 26 and the spigot 16 is a filter 29 through which fluid must pass before entering the chamber 12.

Captively located in the chamber 12 is a movable valve element 30. In this embodiment the element 30 is a spherical ball. In this embodiment the element 30 is urged away from the seat 15 by gravity, since fluid flow through the chamber 12 is generally upward.

In operation of the above described valve 10, fluid flow through the valve 10 will continue provided the flow through the chamber 12 does not exceed a predetermined flow rate.

However should there be a rupture or failure downstream of the valve 10 so as to cause an increase in flow rate beyond a predetermined flow rate, then the valve element 30 due to fluid flow thereby will be pushed into engagement with the seat 15 and thereby close the outlet passage 14. The valve element 30 will be maintained in sealing contact with the seat 15 while there is pressure in the inlet passage 13, and a lower pressure (even atmospheric pressure) in the outlet passage 14.

Accordingly in operation of the above described valve 10, the element 30 is urged away from the seat 15 by gravity but is pushed upwardly into engagement with the seat 15 by upward fluid flow through the chamber 12, to thereby prevent flow.

The body 11 has a threaded bore 31 within which there is mounted a reset mechanism 32. The reset mechanism also provides a gauge 33. By operation of the reset mechanism 32, the element 30 can be moved from engagement with the seat 15 to restore flow should normal operation be achievable. However if there is still failure downstream of the valve 10, then again the element 30 will be moved into engagement with the seat 15.

The mechanism 32 includes a sleeve 34 providing an annular recess 35 providing part of the outlet passage 14. The sleeve 34 has a longitudinal bore 36 that slidably receives the stem 37 of the gauge 33. Extending through the stem 37 and in fluid communication with the operating mechanism of the gauge 33 is a hollow shaft 38. The shaft 38 is fixed to the stem 37 and has an end extremity 39 that is engageable with the element 30. A spring 40 extends between the sleeve 30 and stem 37 to urge the stem 37 (with shaft 38 attached thereto) away from the element 30.

The abovementioned stem 30, with the shaft 38 attached thereto, is movable from an inactive position (as shown) not engaged with the element 30, and an engaged position, engaging the element 30 so as to move the element 30 away from the seat 15.

The abovementioned gauge 33 provides an indication of pressure downstream of the element 30. When the element 30 is engaged with the seat 15, the gauge 33 will show a reduced pressure indicating a failure downstream of the valve 10.

The stem 37 slidably and sealingly engages the ball 36 by means of seals 41.

The direction of flow leaving the chamber 12 is generally normal to the direction of flow entering the chamber 12. Accordingly the inlet passage 13 is intended to be oriented generally horizontally and the flow through the chamber 12 generally vertical.

The angular movement of the fluid resulting from engagement with the surfaces 28 enables a greater flow rate to be achieved.

The invention claimed is:

1. A water valve through which water flows in a predetermined direction including:

a hollow body providing a valve chamber, an inlet passage extending to said chamber, an outlet passage extending from said chamber, the passages providing for water flow through the chamber, and a valve seat exposed to said chamber and from which said outlet passage extends to provide for water flow from said chamber to said outlet passage;

a movable valve element located in said chamber and urged away from said seat, but movable to engage said seat to at least inhibit flow to said outlet passage should water flow through said chamber exceed a predetermined flow; and wherein said inlet passage is at least partly provided by a passage providing member, said member having surfaces to engage water passing thereby to cause the water to move angularly about said direction.

2. The valve of claim 1, wherein said surfaces are provided by grooves in said member, the grooves extending longitudinally and angularly relative to said inlet passage.

3. The valve of claim 1, wherein said surfaces are provided by fins projecting into said inlet passage and extending longitudinally and angularly relative to said inlet passage.

4. The valve of claim 1, wherein said member is a sleeve through which said inlet passage extends.

5. The valve of claim 1, wherein said valve includes a magnet located adjacent said inlet passage so as to provide a magnetic field intersecting with flow passing therethrough.

6. The valve of claim 1, wherein said movable valve element is magnetised.

7. The valve of claim 1, wherein said valve includes a filter through which water flows in said inlet passage passes for delivery to said chamber.

8. The valve of claim 7, wherein said valve includes a valve element engaging member movable between a retracted position not engaged with said element, and an engaged position engaging said element to move the element from engagement with said seat.

9. The valve of claim 8, wherein said engaging member is urged from engagement with said element.

10. The valve of claim 9, wherein said engaging member is a longitudinally hollow shaft in communication with said chamber when said element is not engaged with said seat, and said valve includes a pressure gauge receiving fluid from said shaft to provide an indication of pressure downstream of said element.

11. The valve of claim 10, wherein said element is urged away from said set via gravity and is moved upwardly into engagement with said seat when said predetermined flow is exceeded.

12. The valve of claim 1, wherein the inlet passage extends to direct the water flow horizontally and wherein the chamber extends to direct the water flow vertically with respect to the inlet passage.

* * * * *